US009751172B2

United States Patent
Dohi et al.

(10) Patent No.: US 9,751,172 B2
(45) Date of Patent: Sep. 5, 2017

(54) WORKPIECE FASTENING DEVICE FOR PRESSING PLURALITY OF LOCATIONS OF WORKPIECE

(71) Applicant: FANUC CORPORATION, Minamitsuru-gun, Yamanashi (JP)

(72) Inventors: Yoshiaki Dohi, Yamanashi (JP); Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 98 days.

(21) Appl. No.: 14/952,084

(22) Filed: Nov. 25, 2015

(65) Prior Publication Data
US 2016/0151869 A1 Jun. 2, 2016

(30) Foreign Application Priority Data
Nov. 28, 2014 (JP) .................................. 2014-242434

(51) Int. Cl.
*B23Q 3/08* (2006.01)
*B23Q 1/52* (2006.01)
*B23Q 3/06* (2006.01)

(52) U.S. Cl.
CPC ............. *B23Q 3/082* (2013.01); *B23Q 1/525* (2013.01); *B23Q 3/069* (2013.01)

(58) Field of Classification Search
USPC ................................... 269/21, 32, 41, 281.1
See application file for complete search history.

(56) References Cited

U.S. PATENT DOCUMENTS

| 5,135,206 | A | * | 8/1992 | Martinez | ................. | B25B 5/142 |
| | | | | | | 269/21 |
| 2002/0017751 | A1 | * | 2/2002 | Takahashi | ............... | B25B 5/122 |
| | | | | | | 269/32 |
| 2004/0061268 | A1 | * | 4/2004 | Sawdon | ................. | B25B 5/064 |
| | | | | | | 269/32 |

FOREIGN PATENT DOCUMENTS

| CN | 1325781 | 12/2001 |
| DE | 102010004739 | 7/2011 |
| EP | 2345507 | 7/2011 |
| JP | 45027520 | 10/1970 |
| JP | 59227342 | 12/1984 |
| JP | 60146627 | 9/1985 |

(Continued)

OTHER PUBLICATIONS

Japanese Office Action dated Mar. 8, 2016 for Japanese Application No. 2014-242434.

(Continued)

*Primary Examiner* — Joseph J Hail
*Assistant Examiner* — Shantese McDonald
(74) *Attorney, Agent, or Firm* — RatnerPrestia (57) ABSTRACT

The workpiece fastening device of the present invention comprises a table on which a workpiece is placed, an arm which can move so as to press a workpiece on the table against the table, and a drive part which drives the arm. The arm of the workpiece fastening device comprises a connection member which is connected to the drive part, and a rotary member which is attached to the connection member to be able to rotate about a rotation axis which extends in a direction intersecting with a movement direction of the arm. The rotary member of the arm has first and second pressing parts which are arranged at the opposite sides of the rotation axis and presses a workpiece on the table against the table by the first and second pressing parts.

4 Claims, 6 Drawing Sheets

(56) References Cited

FOREIGN PATENT DOCUMENTS

| JP | 61027632 | 2/1986 |
|----|----------|--------|
| JP | 6325095 | 7/1988 |
| JP | 01163067 | 11/1989 |
| JP | 03-281137 | 12/1991 |
| JP | 04002540 | 1/1992 |
| JP | H11-311240 A | 11/1999 |
| JP | 2012122826 | 6/2012 |

OTHER PUBLICATIONS

Decision to Grant a Patent issued in Japanese Patent Application No. 2014-242434 mailed Jul. 19, 2016 (5 pages).

* cited by examiner

WORKPIECE FASTENING DEVICE FOR PRESSING PLURALITY OF LOCATIONS OF WORKPIECE

BACKGROUND OF THE INVENTION

1. Field of the Invention

The present invention relates to a workpiece fastening device which presses a plurality of locations of a workpiece to fasten the workpiece.

2. Description of the Related Art

There is a device known in the art, which presses a plurality of locations of a workpiece to fasten the workpiece. For example, JP H11-311240A discloses a workpiece clamp fixture which has a pressing member which is connected to a piston rod, and presses a plurality of locations on a larger end part of a connecting rod by means of first to third pressing parts which are integrally formed with the pressing member. In addition, in the field of machine tools, a workpiece fastening device which presses a plurality of locations on a workpiece has been used for stably fastening a workpiece to be processed.

Figure 5:
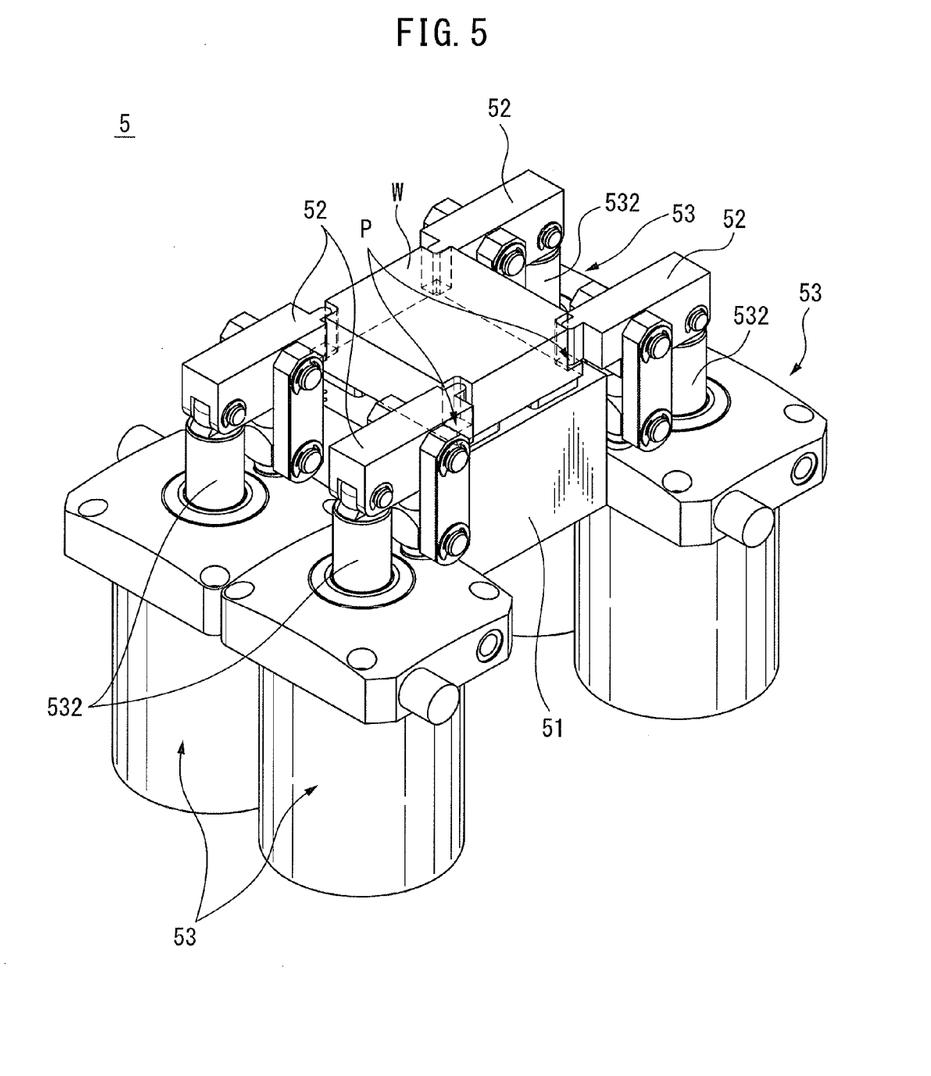
FIG. 5 is a perspective view which shows one example of a conventional workpiece fastening device.

FIG. 5 is a perspective view which shows one example of the above-mentioned conventional workpiece fastening device. The workpiece fastening device 5 of FIG. 5 has four air cylinders 53 which are arranged so as to surround a table 51 of a workpiece W, and pressing arms 52 which are connected to piston rods 532 of the air cylinders 53. In the workpiece fastening device 5 of FIG. 5, when the air cylinders 53 operate and then the arms 52 as a whole move downward in the vertical direction, the front end parts of the arms 52 press the corresponding locations on the workpiece W (pressed parts P) against the table 51. The workpiece fastening device 5 of the present example is provided with the same number of (four) air cylinders 53 as the pressed parts 5 of the workpiece W, and therefore it is necessary to secure sufficient installation space around the table 51.

Figure 6:
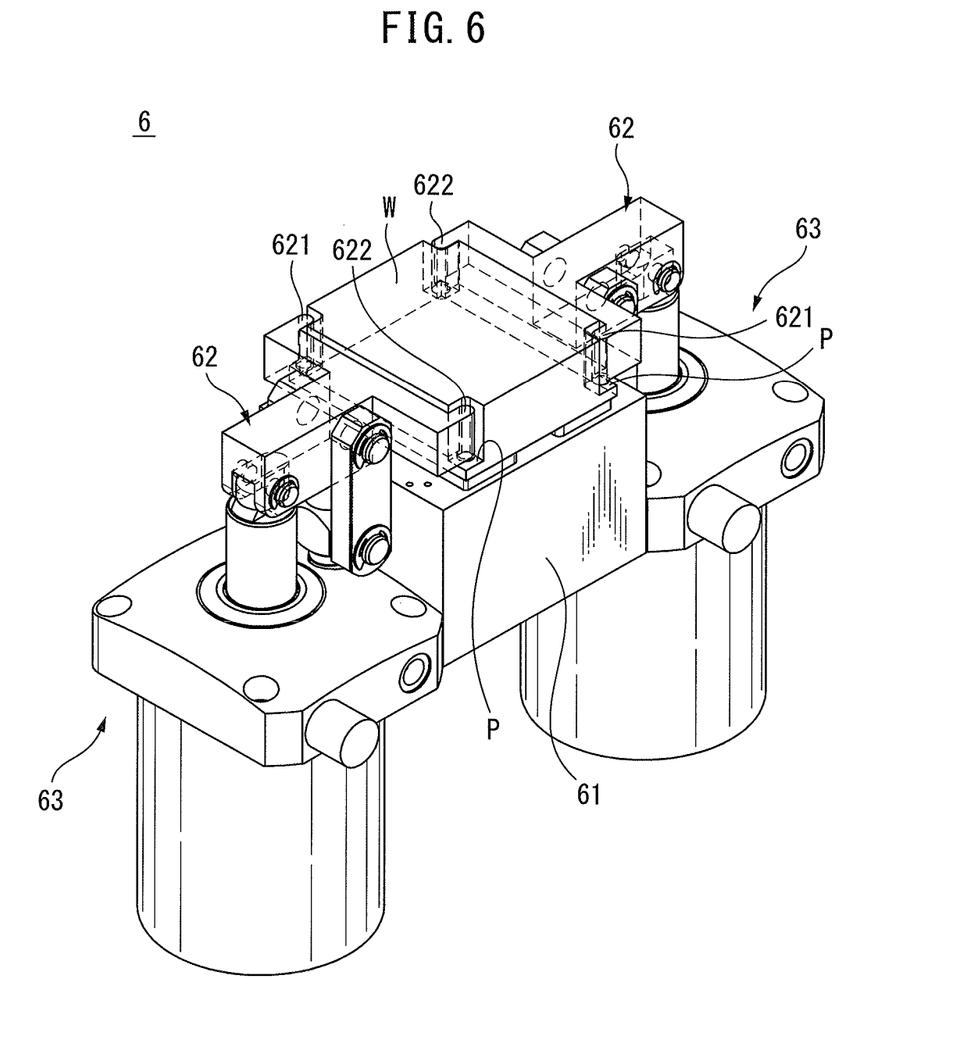
FIG. 6 is a perspective view which shows another example of a conventional workpiece fastening device.

FIG. 6 is a perspective view which shows another example of a conventional workpiece fastening device. The workpiece fastening device 6 of FIG. 6 is used for fastening a workpiece W of the same shape as FIG. 5. However, the workpiece fastening device 6 only has two pressing arms 62 which are arranged at the opposite sides of the table 61, unlike the workpiece fastening device 5 of FIG. 5. More specifically, the workpiece fastening device 6 of this example has a structure where the front end parts of the arms 62 are branched into two parts, and is configured to press the pressed parts P of the workpiece W by means of the pressing parts 621, 622 which are formed on these branch parts. If the workpiece fastening device 6 of FIG. 6 is used, it is possible to reduce the numbers of the air cylinders 63 and arms 62, and therefore it is no longer necessary to secure a large installation space around the table 61.

Figure 7:
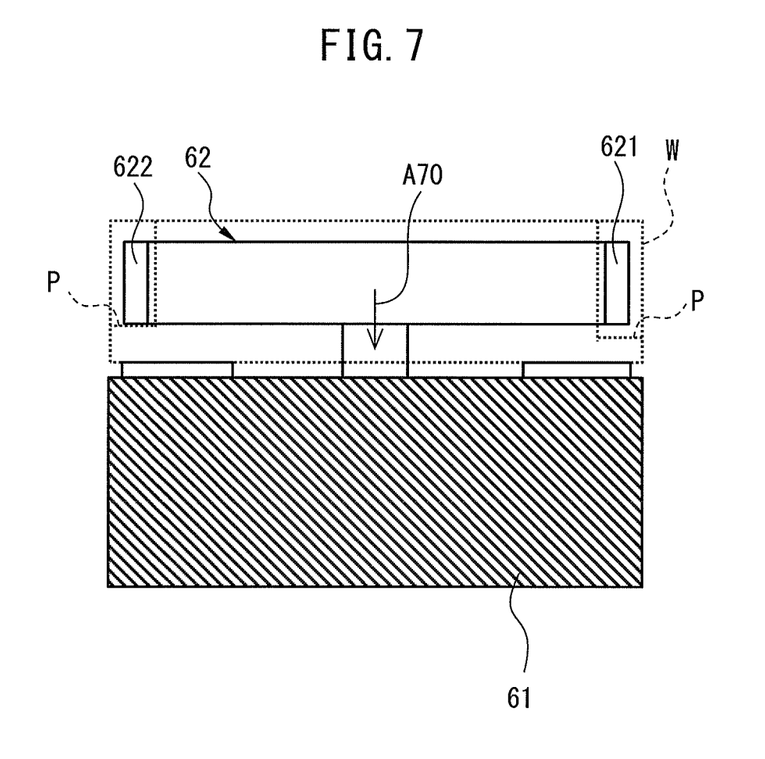
FIG. 7 is a schematic view for explaining uneven loading which may occur in the workpiece fastening device of FIG. 6.

On the other hand, when the workpiece fastening device 6 of FIG. 6 is used, the arm 62 is liable to apply uneven loading to the workpiece W due to manufacturing error of the workpiece W. FIG. 7 is a schematic view for explaining the above uneven loading which may occur in the workpiece fastening device 6 of FIG. 6. More specifically, FIG. 7 is a side view of one arm 62 in FIG. 6 as seen from the position of the other arm 62. In FIG. 7, for convenience, the outside shape of the workpiece W which is placed on the table 61 is shown by the broken lines. Here, the workpiece W in FIG. 6 and FIG. 7 is designed so that the surfaces of the four pressed parts P are positioned on the same plane, and the two pressing parts 621, 622 of each arm 62 are arranged side by side in the horizontal direction so as to be able to simultaneously abut against the surfaces of two pressed parts P. However, if the surfaces of these pressed parts P are not positioned on the same plane due to manufacturing error of the workpiece W, only one of the two pressing parts 621, 622 will abut against and press the workpiece W.

In the example of FIG. 7, the surface of the left side pressing part P in the figure is positioned higher than the surface of the right side pressed part P in the vertical direction. For this reason, if the air cylinder 63 moves the arm 62 downward, only the left side pressing part 622 in the figure will abut against and press the workpiece W. The movement direction of the arm 62 in this process is shown by the arrow A70 in the figure. If the surfaces of pressed parts P of the workpiece W are not positioned on the same plane, these pressed parts P are not evenly pressed by the pressing parts 621, 622 of the arm 2, and therefore the arm 62 as a whole may apply uneven loading to the workpiece W. If the above uneven loading occurs in the machine tool, there is a possibility of deformation of the workpiece W due to the pressing forces of the individual pressing parts 621, 622 or deterioration of the processing precision due to insufficient fastening of the workpiece.

SUMMARY OF INVENTION

A workpiece fastening device which can apply even pressing forces to a plurality of pressed parts of a workpiece is being sought.

According to a first aspect of the present invention, there is provided a workpiece fastening device comprising a table on which a workpiece is placed, an arm which can move so as to press a workpiece which is placed on the table against the table, and a drive part which drives the arm, wherein the arm comprises a connection member which is connected to the drive part, and a rotary member which is attached to the connection member to be able to rotate about a rotation axis which extends in a direction intersecting with a movement direction of the arm, and the rotary member comprises a first pressing part and second pressing part which are arranged at the opposite sides of the rotation axis, and presses a workpiece which is placed on the table against the table by each of the first pressing part and second pressing part.

According to a second aspect of the present invention, there is provided the workpiece fastening device in the first aspect, wherein the first pressing part can rotate about a second rotation axis which is parallel to the rotation axis, and presses a workpiece which is placed on the table against the table by each of a first abutting part and second abutting part which are arranged at the opposite sides of the second rotation axis.

According to a third aspect of the present invention, there is provided the workpiece fastening device in the second aspect, wherein the second pressing part can rotate about a third rotation axis which is parallel to the rotation axis, and presses a workpiece which is placed on the table against the table by each of a third abutting part and fourth abutting part which are arranged at the opposite sides of the third rotation axis.

According to a fourth aspect of the present invention, there is provided the workpiece fastening device in any of the first to third aspects, wherein the drive part is any one of an air cylinder, hydraulic cylinder, or electric motor.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. In the drawings, similar components are assigned similar reference notations. Note that the following explanation does not limit the technical scope of the inventions which are described in the claims or the meaning of terms etc.

Figure 1:
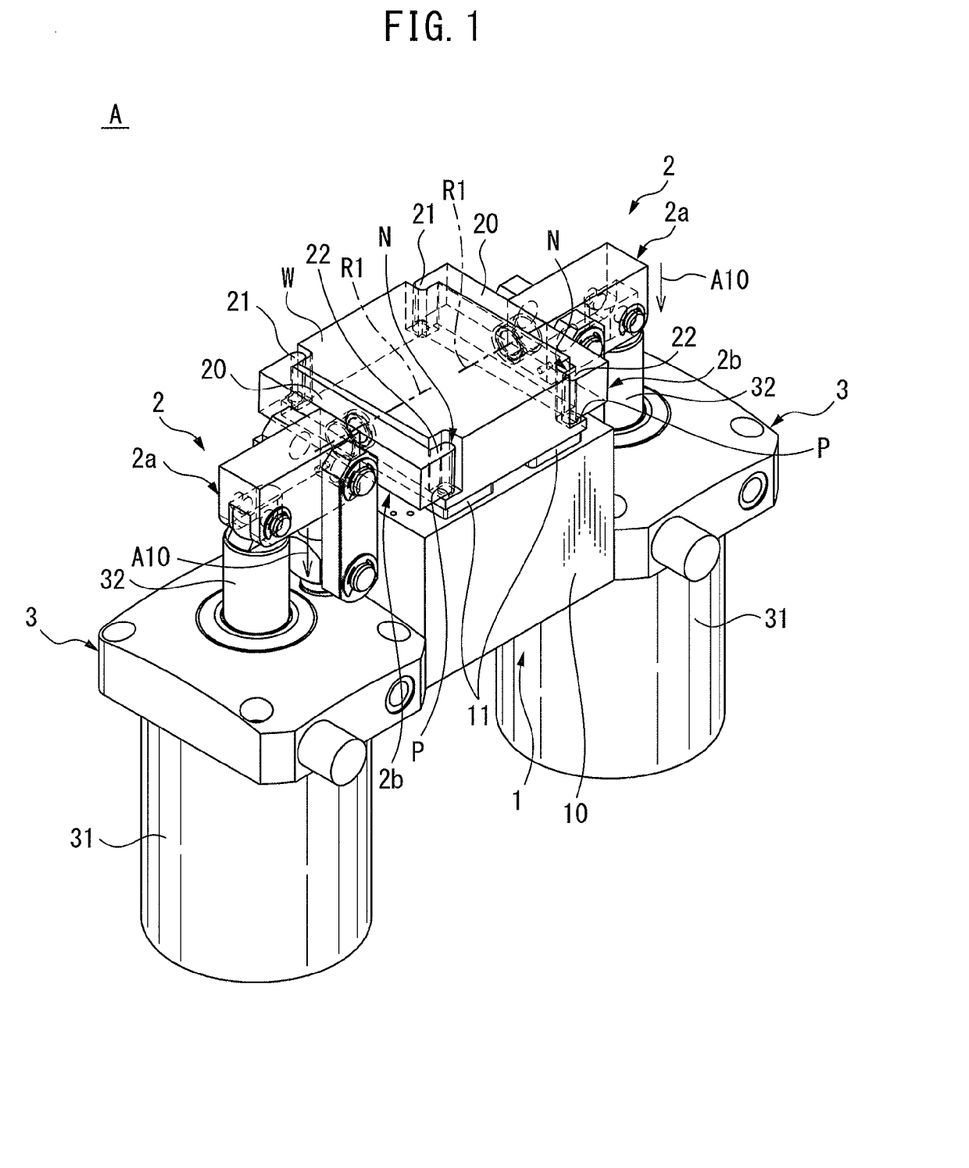
FIG. 1 is a schematic view which shows an illustrative workpiece fastening device of a first embodiment of the present invention.
Figure 2:
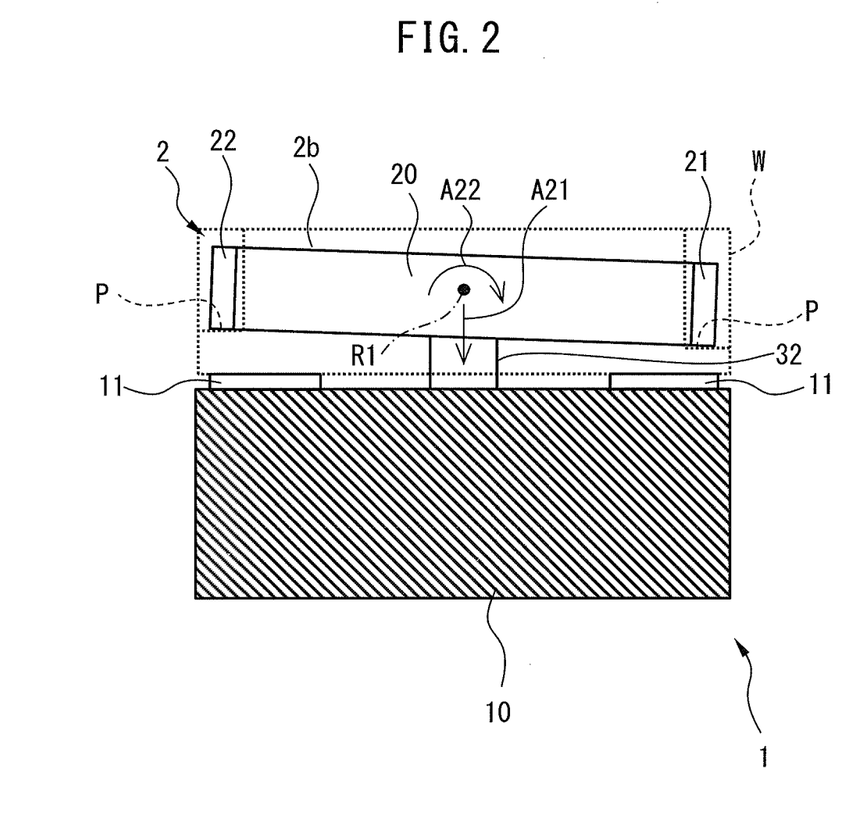
FIG. 2 is a schematic view which shows the state where an arm in FIG. 1 presses a workpiece against a table.

Referring to FIG. 1 and FIG. 2, the workpiece fastening device of the first embodiment of the present invention will be explained. FIG. 1 is a perspective view which shows an illustrative workpiece fastening device A of the present embodiment. The workpiece fastening device A of the present example is used for fastening the workpiece W to be processed by various machine tools (not shown). As shown in FIG. 1, the workpiece fastening device A is provided with a table 1 on which a workpiece W is placed, a pair of arms 2 which are arranged on the both sides of the table 1, and a pair of drive parts 3 which are connected to the pair of arms 2. The detailed structures of these components will be explained below. However, the pair of arms 2 have similar structures to each other, and these arms are arranged symmetrically with respect to the table 1 in the horizontal direction. The same is true for the pair of drive parts 3. For this reason, below, only one arm 2 and one drive part 3 will be explained.

As shown in FIG. 1, the table 1 of the present example has a body part 10 with a rectangular parallelopiped shape, and a plurality of seating parts 11 which are fastened to the top surface of the body part 10. The plurality of seating parts 11 have square pad shapes which stick out from the top surface of the body part 10. The bottom surface of the workpiece W is seated on the top surfaces of the square pads. The plurality of seat parts 11 perform the role of adjusting the seated position of the workpiece W in the direction vertical to the top surface of the body part 10. The process of placing the workpiece W on the table 1 may be automatically performed by a multi-articulated robot or other conveyance apparatus or may be manually performed by a worker. Note that, the table 1 of the example is attached to a machine tool so that the top surface of the body part 10 is parallel with the horizontal plane.

As shown in FIG. 1, an arm 2 of the present example is arranged diagonally above the table 1 and can move so as to press the workpiece W placed on the table 1 against the table 1 (that is, downward in the vertical direction). More specifically, one end part of the arm 2 is connected to a movable member of the drive part 3 explained later. The arm 2 as a whole can move downward in the vertical direction along with linear motion of the movable member. Due to this, the contact locations of the arm 2 with the workpiece W (later explained pressing parts 21, 22) press the workpiece W against the table 1. The movement direction of the arm 2 by the drive part 3 is shown by an arrow A10 in the figure. The specific structure of the arm 2 will be explained later.

As shown in FIG. 1, a drive part 3 of the present example is a general air cylinder which is arranged at one side of the table 1 and below the corresponding arm 2. More specifically, the drive part 3 of the present example is provided with a cylinder 31 in which compressed air is filled, a piston which can slide inside the cylinder 31 by the energy of the compressed air (not shown), and a piston rod 32 which transmits motion of the piston to the arm 2. Usually, an air cylinder is cheaper compared with a hydraulic cylinder or electric motor etc., and therefore according to the workpiece fastening device A of the present example, it is possible to cut the manufacturing cost of the device as a whole. As shown in FIG. 1, the cylinder 31 and piston rod 32 of the present example are arranged with respect to the table 1 so that their extension directions are parallel with the vertical direction. In particular, the cylinder 31 is fastened by a not shown fastening member to the body part 10 of the table 1. Further, the base end part of the piston rod 32 is fastened inside the cylinder 31 to the piston. The front end part of the piston rod 32 sticks out from the top end face of the cylinder 31 upward and is connected with a base end part of the arm 2. That is, the piston rod 32 performs the role of the above-mentioned movable member.

Here, the workpiece W which is fastened by the workpiece fastening device A of the present embodiment will be explained. As shown in FIG. 1, the workpiece W of the present example has the overall shape of a rectangular parallelepiped with a predetermined height. Further, the workpiece W of the example is provided with notched parts N which extend along the four sides of the rectangular parallelepiped in the height direction. These notched parts N extend from the top surface of the rectangular parallelepiped toward the bottom surface over part of the sides in the height direction. Further, the workpiece W of the present example is designed so that the end faces of the four notched parts N in the extension direction are positioned on the same plane parallel to the bottom surface of the rectangular parallelepiped. These end faces perform the role of the pressed parts P to be pressed by the arms 2. In this way, the workpiece W of the present example has a structure where each of the opposite side surfaces are respectively provided with two notched parts N and pressed parts P. A workpiece W which has the above structure is, for example, produced by molding or machining a metal material or plastic material.

Next, the specific structure of an arm 2 of the workpiece fastening device A will be explained. As shown in FIG. 1, the arm 2 of the present example comprises a connection member 2a which has one end part connected to a movable member of the drive part 3 (piston rod 32), and a rotary member 2b which is attached to the connection member 2a to be able to rotate about a predetermined rotation axis R1. The rotary member 2b of the present example is attached to the other end part of the connection member 2a. Further, the above rotation axis R1 extends in a direction intersecting with the movement direction of the movable member (piston rod 32). Typically, the above rotation axis R1 extends in a direction generally perpendicular to the movement direction of the movable member.

As shown in FIG. 1, the connection member 2a of an arm 2 has a columnar shape which extends substantially vertically with respect to the extension direction of the movable member (piston rod 32) of the drive part 3. Further, the rotary member 2b of the arm 2 comprises a columnar shaped body part 20 which extends substantially vertically with respect to the extension direction of the connection member 2a, a first pressing part 21 which extends in the same direction as the connection member 2a from one end part of the body part 20, and a second pressing part 22 which extends in the same direction as the connection member 2a from the other end part of the body part 20. Each of the first pressing part 21 and second pressing part 22 has a dimension and shape corresponding to the notched part N of the workpiece W. For this reason, when the workpiece W is placed on the table 1 and the arm 2 is then driven by the drive part 3, the first pressing part 21 and second pressing part 22 respectively move downward through the notched parts N of the workpiece W.

As shown in FIG. 1, the rotation axis R1 of the rotary member 2b is provided at a predetermined location in the extension direction of the body part 20. Typically, the rotation axis R1 is provided at the center part of the body part 20 in the extension direction (see FIG. 2). However, the rotation axis R1 may also be provided at a location somewhat apart from the center part of the body part 20. In this way, the two pressing parts 21, 22 are arranged on the opposite sides of the rotation axis R1 in the extension direction of the body part 20, and therefore the rotary member 2b rotates about the rotation axis R1 in response to the reaction force which acts from the workpiece W on the two pressing parts 21, 22. Due to this, even if the four pressing parts P of the workpiece W are not positioned on the same planes, even pressing forces can be applied to the workpiece W from the two pressing parts 21, 22 of the arm 2. This point will be explained with reference to FIG. 2. Note that, a posture of the rotary member 2b where the body part 20 is parallel with the horizontal plane will sometimes be referred to below as the "reference posture".

FIG. 2 is a schematic view which shows the state of the arm 2 in FIG. 1 presses the workpiece W against table 1. More specifically, FIG. 2 is a side view of one arm 2 as seen from the position of the other arm 2. In FIG. 2, for convenience, the outer shape of the workpiece W placed on the table 1 is shown by the broken lines. As shown in FIG. 2, the workpiece W of the present example has a relatively large manufacturing error, and therefore the surfaces of the pressed parts P are not positioned on the same plane. In particular, the position of one pressed part P in the height direction differs from the position of the other pressed part P in the height direction. For this reason, if the rotary member 2b in the reference stance moves downward in the vertical direction, only the second pressing part 22 abuts against the workpiece W. In a conventional workpiece fastening device, due to such a difference in the height position, the workpiece may be subjected to uneven loading while the arms press the workpiece (see FIG. 7). However, in the workpiece fastening device A of the present example, while the rotary member 2b is moving further downward, the reaction force which is applied from the right side pressed part P to the second pressing part 22 causes the rotary member 2b to rotate about the rotation axis R1.

In FIG. 2, the movement direction of the arm 2 by the drive part 3 is shown by the arrow A21, and the rotation direction of the rotary member 2b due to the reaction force from the workpiece W is shown by the arrow A22. Due to such rotary motion, the body part 20 of the rotary member 2b becomes inclined with respect to the horizontal plane so as to make up for the difference in the height positions, and the first pressing part 21 of the rotary member 2b thus abuts against the right side pressed part P. After that, if the arm 2 is moved further downward, the first pressing part 21 and second pressing part 22 evenly press the workpiece W against the table 1. In this way, according to the workpiece fastening device A of the present example, the rotary member 2b of the arm 2 rotates about the rotation axis R1 in response to the reaction force from the workpiece W, and therefore even if the four pressed parts P of the workpiece W are not positioned on the same plane, both the first pressing part 21 and second pressing part 22 of the rotary member 2b can abut against the workpiece W. Accordingly, the plurality of pressed parts P of the workpiece W are uniformly pressed by the first pressing part 21 and second pressing part 22 of the arm 2, and therefore it is possible to prevent the arm 2 from applying uneven load pressure on the workpiece W.

As explained above, according to the workpiece fastening device A of the present example, uneven loading is not applied from an arm 2 to the workpiece W, and therefore it is possible to prevent deformation of the workpiece W due to the pressing forces of the individual pressing parts 21, 22, and deteriorating of the processing precision of the machine tool due to insufficient fastening of workpiece W. Further, the workpiece fastening device A of the present example uses the two pressing parts 21, 22 which are mounted on the front end part of each arm 2 to press and fasten the workpiece W. In this way, according to the workpiece fastening device A of the present example, it is possible to fasten the workpiece W using a number of arms 2 smaller than the pressed parts P of the workpiece W, and thus it is possible to reduce the installation spaces of the arms 2 and drive parts 3 and cut the manufacturing costs of the device as a whole.

Note that, in the workpiece fastening device A of the present example, an air cylinder is employed as a drive part 3, but the drive part 3 of the workpiece fastening device A of the present embodiment may also be a hydraulic cylinder or electric motor or other drive means. If a hydraulic cylinder is employed as the drive part 3, the arm 2 can apply a larger pressing force to the workpiece W, and therefore it is possible to fasten the workpiece W more stably. Further, if an electric motor is employed as the drive part 3, the arm 2 can move at a higher speed, and therefore it is possible to shorten the required time of the process for fastening a workpiece W.

Figure 3:
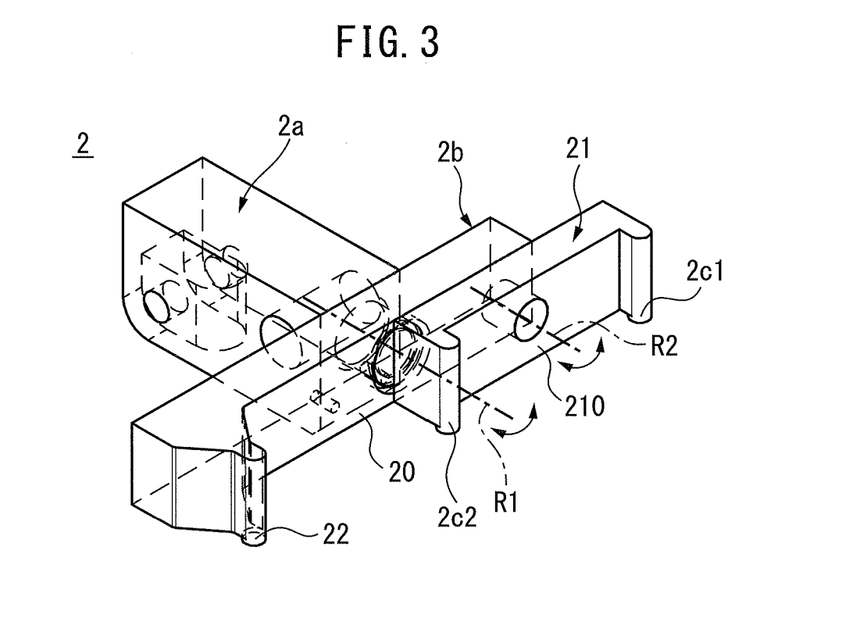
FIG. 3 is a perspective view which shows an illustrative workpiece fastening device of a second embodiment of the present invention.

Next, referring to FIG. 3, the workpiece fastening device of a second embodiment of the present invention will be explained. FIG. 3 is a perspective view which shows an arm 2 of an illustrative workpiece fastening device A of the present embodiment. The workpiece fastening device A of the present embodiment is used for fastening a workpiece W which has three notched parts and pressed parts P which are formed on each of the opposite side surfaces. The overall shape of the workpiece W and the shapes of the individual notched parts N and pressed parts P are similar to the above-mentioned first embodiment. Further, the structures of the table 1 and drive parts 3 of the workpiece fastening device A of the present embodiment are similar to the above-mentioned first embodiment (see FIG. 1 and FIG. 2).

As shown in FIG. 3, an arm 2 of the present example, in the same way as the above-mentioned first embodiment, comprises a connection member 2a which is connected to a movable member of the drive part 3, and a rotary member 2b which is attached to the connection member 2a to be able to rotate about a predetermined rotation axis R1. Below, the above rotation axis R1 will sometimes be called the "first rotation axis R1" to be differentiated from the later explained second rotation axis R2 and third rotation axis R3. As shown in FIG. 3, the rotary member 2b of the arm 2 of the present example has a columnar shaped body part 20 which extends substantially vertically to the extension direction of the connection member 2a, a first pressing part 21 which is attached to one end part of the body part 20, and a second pressing part 22 which extends from the other end part of the body part 20 in the same direction as the connection member 2a. The second pressed part 22 of the present example, in the same way as the above-mentioned first embodiment, has a dimension and a shape corresponding to a notched part N of the workpiece W.

On the other hand, the first pressing part 21 of the present example, unlike the first embodiment, has the form of a rotary member which can rotate about a predetermined second rotation axis R2. This second rotation axis R2 extends substantially parallel to the above first rotation axis R1. As shown in FIG. 3, the first pressing part 21 of the present example has a columnar shaped body part 210 which extends substantially vertically to the second rotation axis R2, a first abutting part 2c1 which extends from one end part of the body part 210 in the same direction as the connection member 2a, and a second abutting part 2c2 which extends from the other end part of the body part 210 in the same direction as the connection member 2a. The first abutting part 2c1 and second abutting part 2c2 respectively have dimensions and shapes corresponding to notched parts N of the workpiece W. For this reason, when the workpiece W is placed on the table 1 and the arm 2 is then driven by the drive part 3, the second pressing part 22, and the first and second abutting parts 2c1, 2c2 move downward through the notched parts N of the workpiece W.

As shown in FIG. 3, the second rotation axis R2 is provided at a predetermined location in the extension direction of the body part 210. Typically, the second rotation axis R2 is provided at the center part in the extension direction of the body part 210. However, the second rotation axis R2 may be provided somewhat apart from the center part of the body part 210. In this way, the two abutting parts 2c1, 2c2 of the first pressing part 21 are arranged at the opposite sides of the second rotation axis R2 in the extension direction of the body part 210, and therefore the first pressing part 21 rotates about the second rotation axis R2 in response to the reaction force which acts from the workpiece W on the two abutting parts 2c1, 2c2.

More specifically, in the workpiece fastening device A of the present example, while the arm 2 as a whole moves downward, the rotary member 2b rotates about the first rotation axis R1 and the first pressing part 21 rotates about the second rotation axis R2 in response to the reaction force which acts from the pressed parts P of the workpiece W. Due to this, even if the six pressed parts P of the workpiece W are not positioned on the same plane, all of the second pressing part 22 and the first and second abutting parts 2c1, 2c2 of the rotary member 2b can abut against the workpiece W. Accordingly, the plurality of pressed parts P of the workpiece W are evenly pressed by the first pressing part 21 and the first and second abutting parts 2c1, 2c2 of the arm 2, and therefore it is possible to prevent the arm 2 as a whole from applying uneven loading to the workpiece W.

Figure 4:
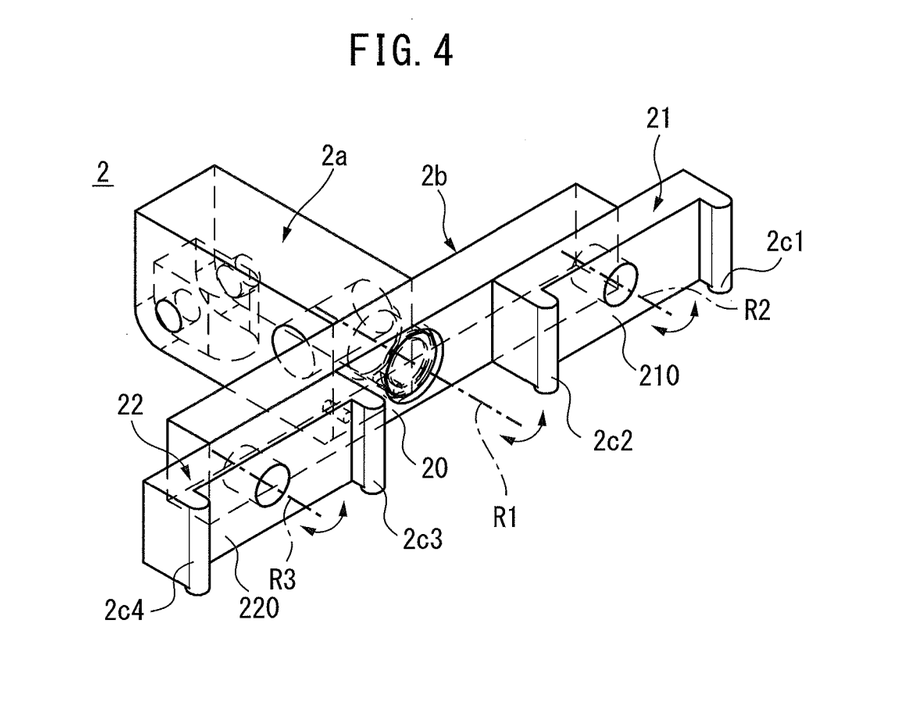
FIG. 4 is a perspective view which shows an illustrative workpiece fastening device of a third embodiment of the present invention.

Next, referring to FIG. 4, a workpiece fastening device of a third embodiment of the present invention will be explained. FIG. 4 is a perspective view which shows an arm 2 of an illustrative workpiece fastening device A of the present embodiment. The workpiece fastening device A of the present embodiment is used for a workpiece W which has four notched parts N and pressed parts P which are respectively formed on each of the opposite side surfaces. The overall shape of the workpiece W and the shapes of the individual notched parts N and pressed parts P are similar to the above-mentioned first embodiment. Further, the structures of the table 1 and drive parts 3 of the workpiece fastening device A of the present embodiment are similar to the above-mentioned first embodiment (see FIG. 1 and FIG. 2).

As shown in FIG. 4, an arm 2 of the present example, in the same way as the above-mentioned first embodiment, comprises a connection member 2a which is connected to a movable member of the drive part 3, and a rotary member 2b which is attached to the connection member 2a to be able to rotate about a predetermined rotation axis R1. As shown in FIG. 4, the rotary member 2b of the arm 2 of the present example has a columnar shaped body part 20 which extends substantially vertically with respect to the extension direction of the connection member 2a, a first pressing part 31 which is attached to one end part of the body part 20, and a second pressing part 22 which is attached to the other end part of the body part 20. The first pressing part 21 of the present example, unlike the first embodiment, has the form of a rotary member which can rotate about a predetermined second rotation axis R2. The specific structure of the first pressing part 21 of the present example is similar to the above-mentioned second embodiment (see FIG. 3).

Further, with reference to the arm 2 shown in FIG. 4, not only the first pressing part 21, but also the second pressing part 22 of the rotary member 2b has the form of a rotary member which is attached to the body part 20 to be able to rotate. The third rotation axis R3 for the second pressing part 22 extends substantially parallel to the first rotation axis R1. As shown in FIG. 4, the second pressing part 22 of the present example comprises a columnar shaped body part 220 which extends substantially vertical to the third rotation axis R3, a third abutting part 2c3 which extends from one end part of the body part 220 in the same direction as the connection member 2a, and a fourth abutting part 2c4 which extends from the other end part of the body part 220 in the same direction as the connection member 2a. The third and fourth abutting parts 2c3, 2c4 respectively have dimensions and shapes corresponding to the notched parts N of the workpiece W. For this reason, when the workpiece W is placed on the table 1 and the arm 2 is then driven by the drive part 4, the first to fourth abutting parts 2c1-2c4 move downward through the notched parts N of the workpiece W.

As shown in FIG. 4, the third rotation axis R3 is provided at a predetermined location in the extension direction of the body part 220. Typically, the third rotation axis R3 is provided at the center part in the extension direction of the body part 220. However, the third rotation axis R3 may also be provided at a location somewhat apart from the center part of the body part 210. In this way, the two abutting parts 2c3, 2c4 of the second pressing part 22 are arranged at the opposite sides of the third rotation axis R3 in the extension direction of the body part 220, and therefore the second pressing part 22, in the same way as the first pressing part 21, rotates about the third rotation axis R3 in response to the reaction force which acts from the workpiece W on the two abutting parts 2c3, 2c4.

More specifically, in the workpiece fastening device A of the present example, when the arm 2 as a whole moves downward, the rotary member 2b rotates about the first rotation axis R1, and the first and second pressing parts 21, 22 respectively rotate about the second and third rotation axes R2, R3 in response to the reaction force from the pressed parts P of the workpiece W. Due to this, even if the eight pressed parts P of the workpiece W are not positioned on the same plane, all of the first to fourth abutting parts 2c1-2c4 of the rotary member 2b can abut against the workpiece W. Accordingly, the plurality of pressed parts P of the workpiece W are uniformly pressed by the first to fourth abutting parts 2c1- 2c4 of the arm 2, and therefore it is possible to prevent the arm 2 as a whole from applying uneven loading to the workpiece W.

Note that, the workpiece fastening device A of the present example can be used to simultaneously fasten two workpieces W having the structures illustrated in FIG. 1. In this case, the two workpieces W are arranged side by side on the table 1, and the pressed parts P of one workpiece W are pressed by the first and second abutting parts 2c1, 2c2 of the first pressing part 21 while the pressed parts P of the other workpiece W are pressed by the third and fourth abutting parts 2c3, 2c4 of the second pressing part 22. In this way, according to the workpiece fastening device A of the present example, even if the plurality of pressed parts P of the individual workpieces W are not positioned on the same planes, uniform pressing forces can be applied from the first and second abutting parts 2c1, 2c2 to one workpiece W, and uniform pressing forces can be applied from the third and fourth abutting parts 2c3, 2c4 to the other workpiece W.

Effect of Invention

According to the first aspect of the present invention, a rotary member of an arm rotates in response to a reaction force from the workpiece, and therefore even if the plurality of pressed parts of the workpiece are not positioned on the same plane, both of the first and second pressing parts of the rotary member can abut against the workpiece. Therefore, the plurality of pressed parts of the workpiece are evenly pressed by the first and second pressing parts of the arm, and therefore it is possible to prevent the arm as a whole from applying uneven loading to the workpiece. As a result, according to the first aspect, it is possible to prevent deformation of the workpiece due to the pressing forces of the individual pressing parts and deterioration of the processing precision of the machine tool due to insufficient fastening of the workpiece.

According to the second aspect of the present invention, not only the rotary member of an arm, but also the first pressing part of the rotary member rotates in response to the reaction force from the workpiece, and therefore even if the plurality of pressed parts of the workpiece are not positioned on the same plane, the second pressing part of the rotary member and the first and second abutting parts of the first pressing part can all abut against the workpiece. Therefore, according to the second aspect, the plurality of pressed parts of the workpiece are evenly pressed by the second pressing part and the first and second abutting parts of the arm, and therefore it is possible to prevent the arm as a whole from applying uneven loading to the workpiece.

According to the third aspect of the present invention, not only the rotary member of an arm, but also both the first and second pressing parts of the rotary member rotate in response to the reaction force from the workpiece, and therefore even if the plurality of pressed parts of the workpiece are not positioned on the same plane, all of the first and second abutting parts the first pressing part and the third and fourth abutting parts of the second pressing part can abut against the workpiece. Therefore, according to the third aspect, the plurality of pressed parts of the workpiece are evenly pressed by the first to fourth abutting parts of the arm, and therefore it is possible to prevent the arm as a whole from applying uneven loading to the workpiece.

According to the fourth aspect of the present invention, various effects can be achieved in accordance with the properties of the air cylinders, hydraulic cylinders, and electric motors. For example, if air cylinders are employed as the drive parts, it is possible to cut the manufacturing costs of the device as a whole. Further, if hydraulic cylinders are employed as the drive parts, the arm can apply larger pressing force to the workpiece, and therefore it is possible to fasten the workpiece more stably. Further, if electric motors are employed as the drive parts, the arm can move at a higher speed, and therefore it is possible to shorten the required time for the step of fastening the workpiece.

The present invention is not limited to only the above embodiments and can be changed in various ways within the scope which is described in the claims. For example, the workpiece fastening device A is provided with a pair of arms 2 which are arranged at the both sides of the table 1, but the workpiece fastening device of the present invention may be provided with three or more arms which are arranged so as to surround the table. Further, the workpiece fastening device A is provided with drive parts 3 constituted by air cylinders, hydraulic cylinders, or electric motors. The drive parts of the workpiece fastening device of the present invention can be any drive devices which can create linear motion of the arms. Further, the dimensions, shape, material, etc. of the various parts of the workpiece fastening device A are only examples. Various dimensions, shapes, materials, etc. may be employed for achieving the effects of the present invention. Similarly, the above-mentioned structure of the workpiece W, in particular the number, shapes, etc. of the pressed parts P of the workpiece W, are only examples. The structure of the workpiece which is fastened by the workpiece fastening device of the present invention is not limited to only the above-mentioned content.

The invention claimed is:

1. A workpiece fastening device comprising
a table on which a workpiece is placed, said workpiece having notched parts which extend along a portion in a height direction thereof,
an arm which can move so as to press said workpiece which is placed on said table against said table, and
a drive part which drives said arm, wherein
said arm comprises a connection member which is connected to said drive part, and a rotary member which is attached to said connection member to be able to rotate about a rotation axis which extends in a direction intersecting with a movement direction of said arm, and
said rotary member comprises a first pressing part and second pressing part which are arranged at the opposite sides of said rotation axis, each of said first pressing part and second pressing part sticks out in a direction of said rotation axis and has a dimension and shape corresponding to each of said notched parts, and
said first pressing part and second pressing part presse said notched parts of said workpiece which is placed on said table against said table by each of said first pressing part and second pressing part.

2. The workpiece fastening device according to claim 1, wherein
said first pressing part can rotate about a second rotation axis which is parallel to said rotation axis, and presses a workpiece which is placed on said table against said table by each of a first abutting part and second abutting part which are arranged at the opposite sides of said second rotation axis.

3. The workpiece fastening device according to claim 2, wherein
said second pressing part can rotate about a third rotation axis which is parallel to said rotation axis, and presses a workpiece which is placed on said table against said table by a third abutting part and fourth abutting part which are arranged at the opposite sides of said third rotation axis.

4. The workpiece fastening device according to claim 1, wherein said drive part is any one of an air cylinder, hydraulic cylinder, and electric motor.

* * * * *